United States Patent [19]
Congleton

[11] 3,987,956
[45] Oct. 26, 1976

[54] CONTAINER
[75] Inventor: Wayne Congleton, Whittier, Calif.
[73] Assignee: Dolco Packaging Corporation, Burbank, Calif.
[22] Filed: Dec. 26, 1974
[21] Appl. No.: 536,504

Related U.S. Application Data
[63] Continuation-in-part of Ser. No. 343,605, March 21, 1973, Pat. No. 3,868,054, which is a continuation-in-part of Ser. No. 273,558, July 20, 1972, Pat. No. 3,834,609.

[52] U.S. Cl. ............................ 229/28 R; 47/34.13; 47/37; 206/423; 206/523; 229/2.5 R; 229/14 C; 220/23.4
[51] Int. Cl.² ............................................ A01G 9/10
[58] Field of Search ............... 229/2.5, 14 C, 28 R, 229/30, 16 C; 206/419, 421, 422, 423, 443, 523; 220/4 E, 23.4; 47/37, 37.2, 37.3, 38, 34.13

[56] References Cited
UNITED STATES PATENTS

| | | | |
|---|---|---|---|
| 1,731,007 | 10/1929 | Berger | 229/16 C |
| 2,223,360 | 12/1940 | Ellis | 47/38 |
| 2,406,254 | 8/1946 | Ringler | 229/16 C |
| 3,053,010 | 9/1962 | Shazor, Jr. | 47/38 |
| 3,386,607 | 6/1968 | Keene | 229/14 C |
| 3,400,873 | 9/1968 | Bessett | 229/2.5 |
| 3,788,002 | 1/1974 | Suchka | 229/28 R |
| 3,807,622 | 4/1974 | Belcher et al. | 229/2.5 |

FOREIGN PATENTS OR APPLICATIONS
772,455   4/1957   United Kingdom ............... 47/34.13

*Primary Examiner*—Stephen P. Garbe
*Assistant Examiner*—Bruce H. Bernstein
*Attorney, Agent, or Firm*—Nilsson, Robbins, Dalgarn & Berliner

[57] ABSTRACT

An improved container, particularly useful for containing plants, seeds, or seedlings in soil for shipment, is formed of a blank which when unassembled is in a generally planar configuration. A plurality of hinge lines formed in the blank divide the blank into a minimum of three parts and enable the member to be folded into a configuration having a generally U-shaped cross-section. The hinge lines consist of lines of weakness interposed with cut-out tabs which break away from the center section of the blank when it is folded to form feet for the container. A plurality of indentations formed in the blank meet when the blank is folded to divide the container into a plurality of discreet compartments. Opposite side edges of the blank can be continued and folded from hinge lines thereat to form lids for the compartments.

2 Claims, 6 Drawing Figures

CONTAINER

CROSS-REFERENCE TO RELATED APPLICATIONS

The present application is continuation-in-part of my application Ser. No. 343,605, filed Mar. 21, 1973, now U.S. Pat. No. 3,868,054 which, in turn, is a continuation-in-part of application Ser. No. 273,558, filed July 20, 1972, now U.S. Pat. No. 3,834,609.

FIELD OF THE INVENTION

The field of art to which the invention pertains is the field of container assemblies.

BACKGROUND AND SUMMARY OF THE INVENTION

In the shipping of small plants, seedlings and soil packed seeds, it is common to use individual containers therefor with attendant costs and handling disadvantages. In the aforementioned patent application, a container assembly is disclosed, which, when unassembled, is of a generally planar configuration, enabling a plurality of the assemblies to be stacked when unassembled. When the sections of the assembly are folded and secured, the indentations in adjacent sections are positioned so as to divide the container into a plurality of discreet compartments.

The present invention provides a container assembly which can be stacked and stored with a minimum of space. The container is particularly suitable for containing poinsettias, chrysanthemums or other strong-stemmed plants, seeds, seedlings or the like, packed in soil for shipment and these plants may be removed from the compartments without destroying the container.

Specifically, the container assembly is formed of a blank, which, when unassembled, has a generally planar configuration when stored, and which assembles into a generally U-shaped cross-sectional configuration. The container assembly is divided into a plurality of predetermined compartments by internal hollow ribs formed by indentations in the opposite surfaces of the walls thereof, which ribs interact when the blank is folded.

The hinge lines along which the blank is folded are made up of tabs cut-out with alternating lines of weakness. The tabs are cut out of the center section so that when the blank is folded the tabs break away from the center section and form "feet" for the container. These feet elevate the bottom of the container so that it is no longer in contact with any adjacent surface and their withdrawal defines openings in the center section (the bottom of the U-shaped container) to allow drainage of liquid from the compartments. The feet and corresponding openings prevent stagnation of the soil water allowing healthy root propagation. Since no part of the blank is completely punched out, there is no waste material to clog machinery or to dispose of in the manufacturing process.

These advantages of the invention, both as to its construction and mode of operation, will be readily appreciated as the same becomes better understood by reference to the following detailed description when considered in connection with the accompanying drawings, in which like reference numerals designate like parts throughout the figures.

DETAILED DESCRIPTION OF THE DRAWINGS

Figure 1:
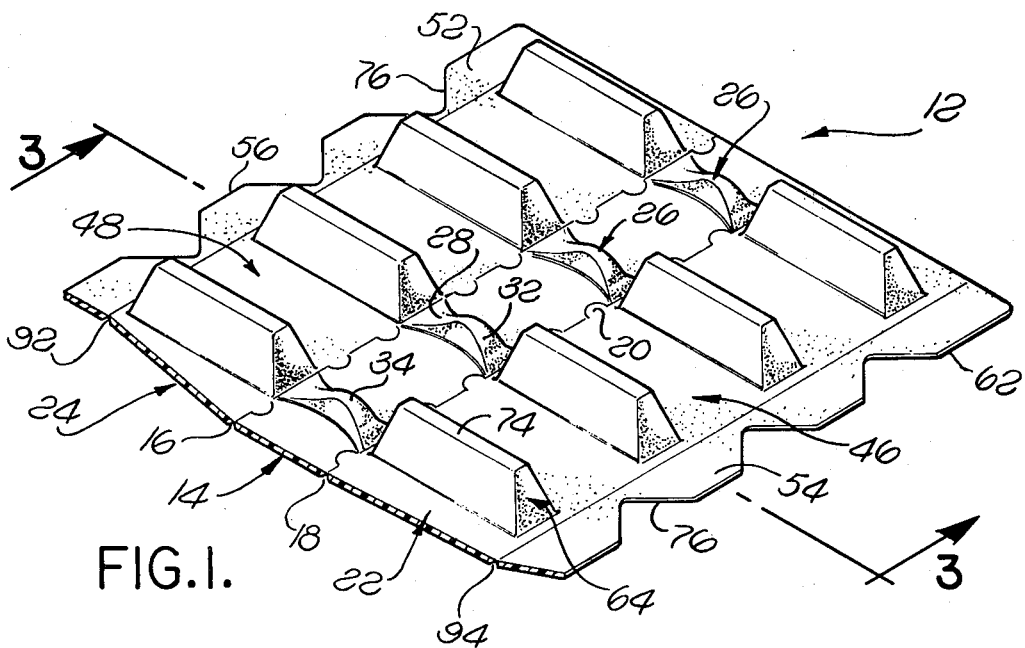
FIG. 1 is a top partial perspective view of a portion of one of the container blanks in unassembled form.

In the drawings, only a portion of a complete container is illustrated, for simplicity of drawing. Any desired number of compartments can be provided in each container, a typical configuration containing 10 compartments.

Figure 2:
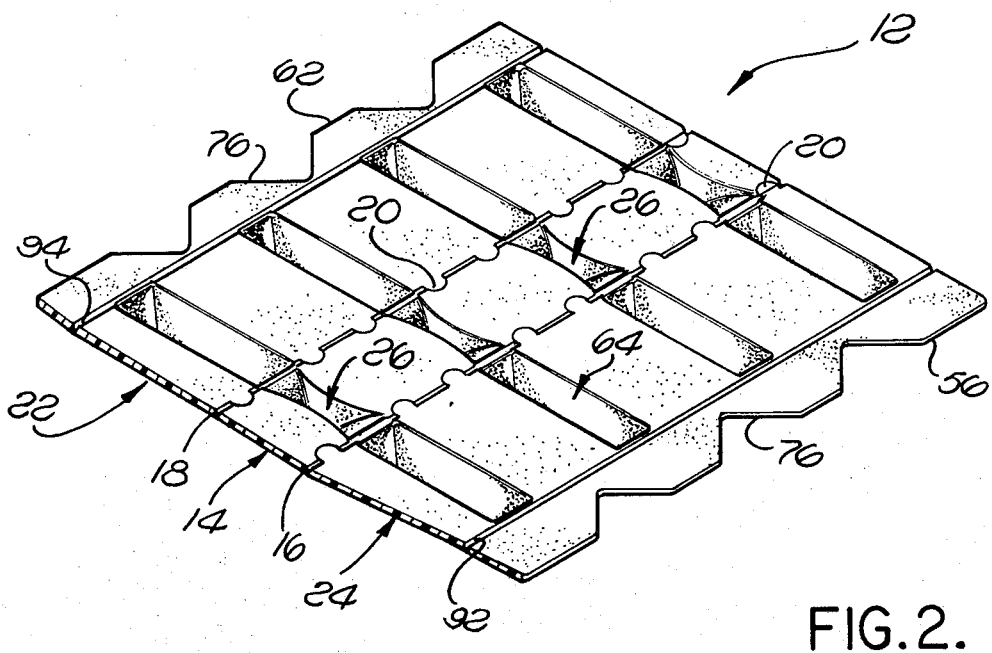
FIG. 2 is a bottom partial perspective view of the container blank of FIG. 1.

Referring now to FIGS. 1 and 2, there is shown a container 12 in unassembled form made in accordance with the principles of the invention. The container 12 is formed from sheets of substantially uniform thickness expanded polystyrene and is formed with a plurality of indentations (resulting in hollow ribs on the opposite side) which allow stacking of a plurality of the container assemblies in unassembled form. The container comprises a central section 14 which is interconnected by hinge lines 16 and 18, defined by lines of weakness, to a first side section 22 and a second side section 24, respectively.

The polystyrene sheet is indented to form a plurality of protuberances 26 into the interior of the container spaced along the longitudinal axis of the central section. The surfaces 28 and 32 of each protuberance 26 are formed on opposite sides of a central peak 34 and the plurality of peaks 34 define a plane parallel to the axis of the central section 14. The surfaces 28 and 32 are of generally trapezoidal shape with the wide base of the trapezoid being adjacent the hinge lines 16 and 18, respectively. The first side section 22 and the second side section 24 which join the central section 14 at the hinge lines 16 and 18, respectively, are mirror images of each other on their interior surfaces 46 and 48, respectively.

Figure 6:
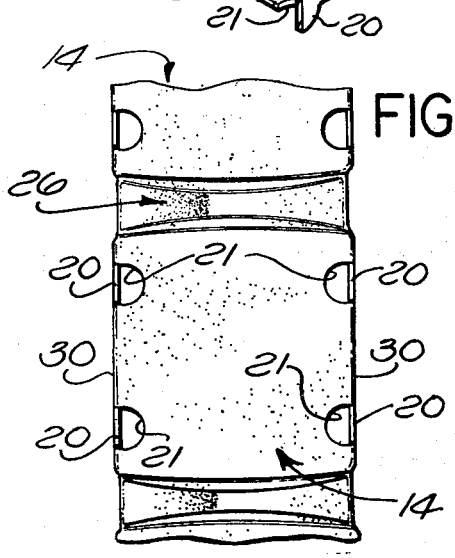
FIG. 6 is a bottom plan view of a section of preassembled container.

Referring additionally to FIG. 6, cut-out tabs 20 are formed through the central section 14 adjacent the hinge lines 16 and 18 and spaced therealong so that the tabs 20 alternate with segments 30 of the lines of weakness. The tabs 20 constitute "feet" which enable the assembled container to be raised from a surface upon which it is mounted or positioned and advantageously results in creation of drainage openings 21. Each tab 20 is formed from a portion of the central section 14 and continues rigidly integral with the adjacent side section 22 or 24 so that when the blank is folded, the tabs 20 extend, leaving the openings 21. The base of each tab 20 will be seen to be axial with the lines of weakness defined by the regions 30.

Figure 4:
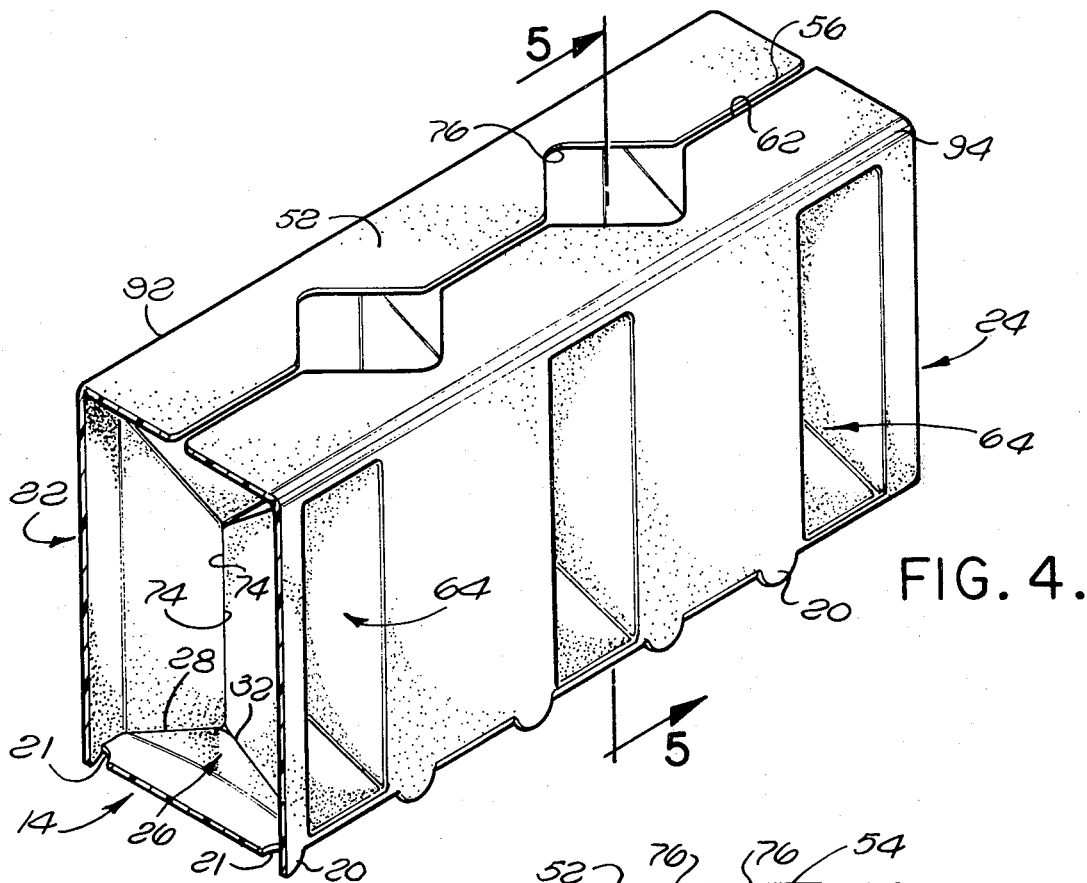
FIG. 4 is a perspective view of the container blank of FIG. 1 shown assembled.
Figure 5:
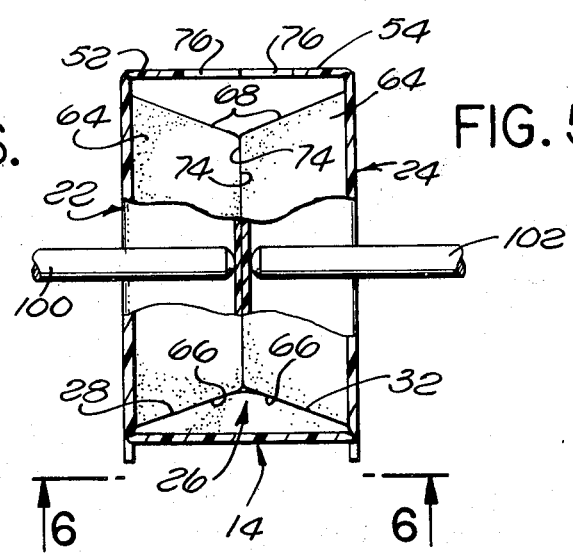
FIG. 5 is a cross-sectional view of the assembled container of FIG. 4 taken along the line 5—5 thereof showing also heating elements which may be used to secure the blank in a U-shaped configuration.

Referring to FIGS. 4 and 5, a plurality of generally trapezoidally shaped hollow ribs 64, defined by tapered surfaces 66, are formed adjacent opposite sides of the hinge lines 16 and 18 and are transversely spaced along the interior surfaces of the first and second side sections in planes parallel to central protuberances 26. The tapered shape of each rib 64 is such that when the container assembly is folded in the manner illustrated in FIGS. 4 and 5, a close fit with the surfaces 28 or 32, respectively, of the center section protuberances 26 is formed. The crest 74 of each rib 64 tapers slightly from its proximal end 66 toward its distal end 68 so that when the container assembly is folded as illustrated in FIG. 5, opposed crests 74 of each of the ribs 64 will abut each other and fold slightly inwardly at an acute angle respective the bottom base, central section 14, 38.

Figure 3:
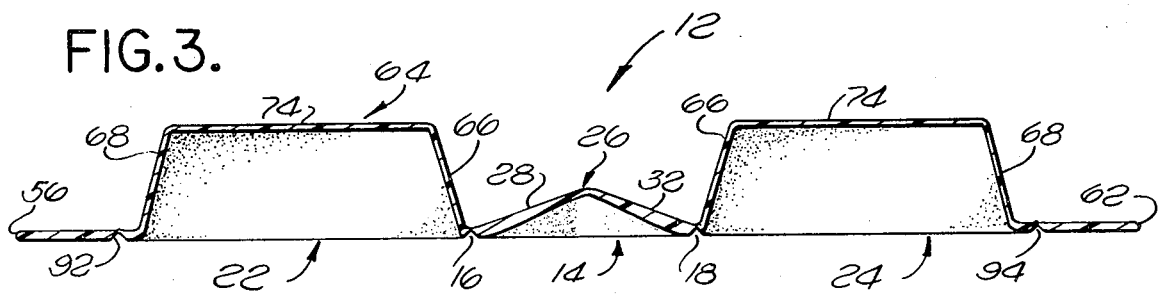
FIG. 3 is a cross-sectional view of the container blank of FIG. 1 taken along the line 3—3 of FIG. 1.

As shown in FIGS. 3 and 4, the blank can include lids 52 and 54 formed as continuation of the outer edges of the two side sections 22 and 24, respectively. The lids 52 and 54 fold along hinge lines 92 and 94, respectively, to form a top for the container. The container assembly can be used to ship seedlings or other types of fragile goods. Optional notched openings 76 in the edges 56 and 62 of the lids 52 and 54 allow the stem and leaves of a seedling or plant to extend above the container, while at the same time lids 52 and 54 prevent the soil from spilling out of the container should the container be upset. When the container is packed with soil, the openings 76 allow air circulation facilitated by the feet tabs 20 and the lower openings 21, thereby preventing the accumulation of stagnant water pools.

When folded, the assembly can be secured by adhesive or other such means. Referring to FIG. 5, the assembly can advantageously be secured by heat welding. The deep shapes of the ribs 64 enable a pair of cal (heat) rods 100 and 102 to be inserted from opposite sides of each rib to weld the assembly together. Banks of cal rods can be disposed for simultaneous insertion or a pair thereof reciprocated in coordination with movement thereby of one assembled container.

I claim:
1. A container assembly comprising:
a blank formed with side sections and with a center section which interconnects said side sections by hinge lines defining the lower edges of said side sections and which enable said blank to be folded into a predetermined shape having a U-shaped cross-sectional configuration;
a plurality of cut-out tabs spaced along each of said hinge lines, alternating with lines of weakness therealong, each tab being formed from a portion of material of the center section of said blank adjacent one of said hinge lines and leaving an opening in said adjacent center section material whereby said tabs extend downwardly from said container, when assembled, to elevate said center section above a surface upon which the container rests;
a plurality of hollow ribs formed by indentations in said blank, opposing pairs of said ribs being spaced along the axis of said container to divide said container into a plurality of discreet compartments when said blank is folded along said hinge lines, at least one of said cut-out tabs being located in each of said compartments; and
a plurality of lids which fold along lines of weakness along the outer edges of said side structure, said lids being notched to allow the material contained therein to protrude partially from the container assembly.

2. A container assembly comprising:
a blank formed with side sections and a center section and with hinge lines defining the lower edges of said side sections and enabling said blank to be folded into a predetermined shape;
a plurality of cut-out tabs spaced along each of said hinge lines, alternating with lines of weakness therealong, each tab being formed from a portion of material of said blank said material being adjacent one of said hinge lines and opposite a side section thereof when said blank is assembled, leaving an opening in said adjacent blank material;
a plurality of hollow ribs formed by indentations in said blank; and
a plurality of lids which fold along lines of weakness along the outer edges of said side section, said lids being notched to allow the material contained therein to protrude partially from the container assembly.

* * * * *